Nov. 9, 1926.
A. E. FOWLE
1,606,409
SHEET GLASS DRAWING APPARATUS
Filed April 20, 1923
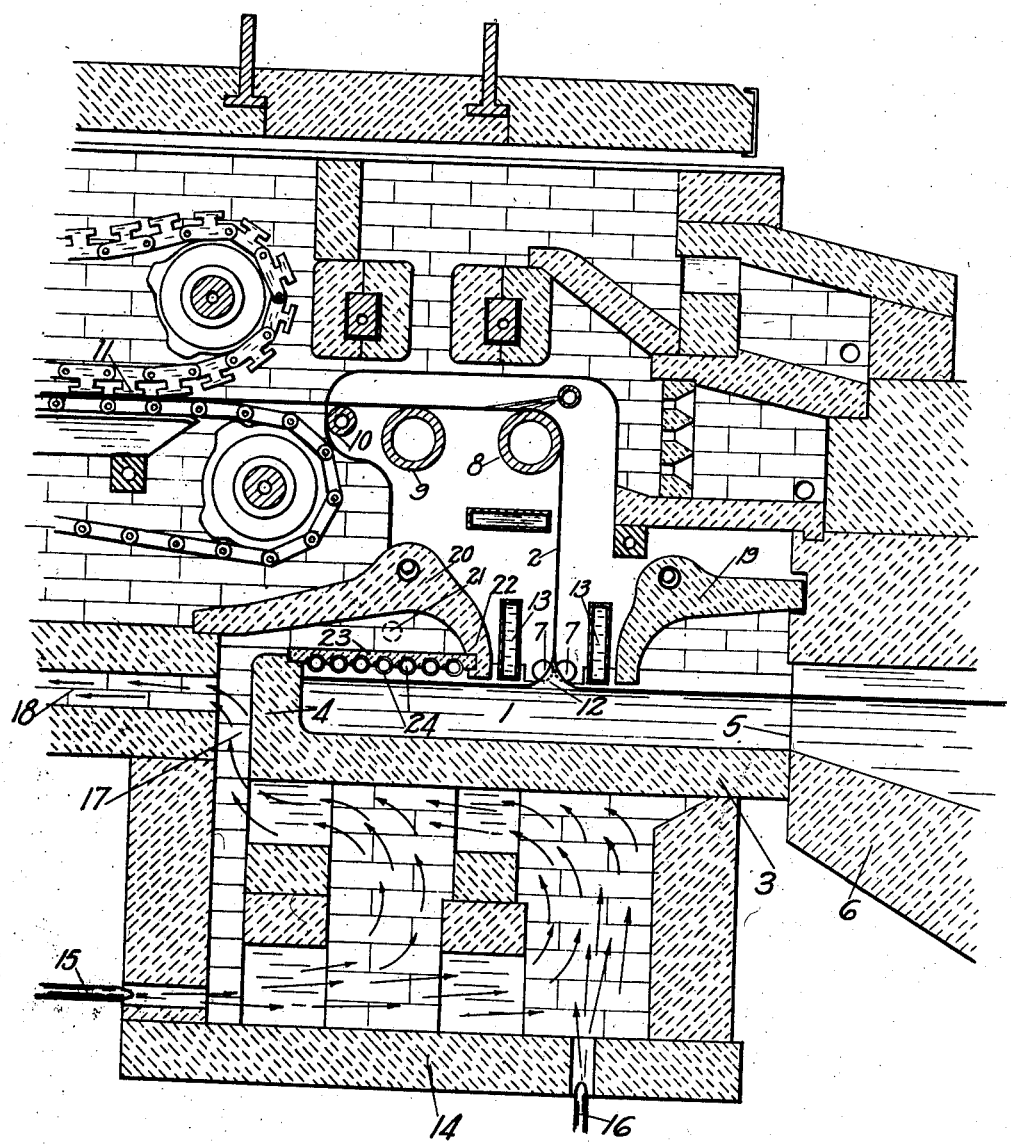
INVENTOR
Arthur E. Fowle
BY C.A.Rowley
ATTORNEY Patented Nov. 9, 1926.

1,606,409

UNITED STATES PATENT OFFICE.

ARTHUR E. FOWLE, OF TOLEDO, OHIO, ASSIGNOR TO THE LIBBEY-OWENS SHEET GLASS COMPANY, OF TOLEDO, OHIO, A CORPORATION OF OHIO.

SHEET-GLASS-DRAWING APPARATUS.

Application filed April 20, 1923. Serial No. 633,427.

This invention relates to improvements in the art of drawing sheet glass, and more particularly to an improved process and apparatus for controlling the temperature of the surface glass in the receptacle from which the sheet is drawn.

In sheet glass drawing machines, of the type disclosed in the patent to Colburn, 1,248,809, issued December 4, 1917, the sheet is drawn upwardly from a shallow pot or receptacle which is closed at one end, and in open communication at the other end with a continuous tank furnace. The surface glass adjacent the sheet source is exposed to the atmosphere and is further cooled by artificial cooling means to allow the sheet to be drawn at a more rapid rate. The remainder of the surface glass in this shallow receptacle is enclosed by suitable cover-tiles. The cover-tile adjacent the end of the receptacle which communicates with the melting tank receives sufficient heat from the furnace to maintain this portion of the surface glass at the requisite temperature. Additional heat must be provided beneath the tile covering the closed end of the receptacle to maintain this slower moving glass at the proper temperature, and to prevent devitrification. In the past, this has been accomplished by providing burners beneath the cover-tile above the molten glass, or by directing a portion or all of the hot gases from the heating furnace beneath the receptacle around the closed end of the pot and beneath the cover-tile against the surface glass at this end of the receptacle. In either case, dirt and soot from the hot gases are deposited to some extent upon the surface glass causing blemishes when these materials are later drawn into the sheet. Furthermore, such of the gases as escape beneath the outer lip of the cover-tile form an injurious coating on the cooler which is placed between the cover-tile and the sheet.

In order to do away with these unsatisfactory conditions and at the same time maintain this surface glass in the closed end of the receptacle at the required temperature, a protecting shield is placed over this portion of the surface glass, and an electric heating means is suspended from the lower surface of this shield closely above the surface glass to supply the heat formerly provided by the heated gases.

The invention will be more clearly understood from the following detailed description of one approved form of the apparatus.

The accompanying drawing is a longitudinal vertical section through those portions of the machine most directly connected with the present invention.

The molten glass 1 from which sheet 2 is drawn upwardly, is contained in the shallow draw-pot or receptacle 3, closed at one end 4, and in open communication at the other end 5 with the delivery end 6 of a continuous tank furnace or other source of molten glass. In the form of sheet drawing apparatus here illustrated, as described more in detail in the Colburn patent referred to above, sheet 2 is drawn upwardly from the molten glass 1 between edge-forming rolls 7, and then deflected into the horizontal plane over a bending roll 8 and drawn over suitable intermediate supporting rolls 9 and 10 through the drawing and flattening mechanism 11, from which it passes into the annealing lehr. All of the above, as well as other features indicated in the accompanying drawing but not here mentioned, are described in detail in the Colburn patent above noted. The surface glass in the receptacle adjacent the sheet source 12 is exposed to the cooling effect of the atmosphere and its temperature is further lowered by the water coolers 13 positioned closely above the surface glass and at either side of the sheet 2. This cooling reduces the molten glass to such a tenacious but plastic condition that it may be rapidly drawn upwardly in sheet form.

In order to prevent the too rapid cooling of the remainder of the molten glass 1 in receptacle 3, a heating furnace 14 is provided beneath the receptacle. The heated gases from burners 15 and 16 are directed into this furnace against the lower surface of receptacle 3, as indicated by the arrows. They then pass upwardly around the closed end 4 of the receptacle through passage 17 and thence through flue 18 to the stack. The surface glass at either side of the coolers 13 is enclosed by a pair of cover-tiles 19 and 20. The space between cover-tile 19 is in open communication with the heated area above the molten glass in the producing furnace and this heat will maintain the surface glass at this end of receptacle 3 at the required temperature. Additional heat must be provided beneath cover-tile 20 to keep the more slowly moving glass at the closed or stagnant end of receptacle 3 at such a temperature that no devitrification will take place. In the past, this has been accomplished either by providing burners as indicated in dotted lines at 21, beneath tile 20 and above the molten glass 1, or by directing a portion or all of the heated gases from furnace 14 around the closed end 4 of the pot through passage 17 and thence beneath the cover-tile 20 and against the surface glass at the closed end of the receptacle. These gases are then drawn off through flues at the sides of the receptacle or escape beneath the downwardly turned end 22 of cover-tile 20. In any case the burnt gases deposit soot and dirt upon the surface glass which, when drawn into sheet 2, cause defects in the finished sheet. Also, the gases escaping beneath end 22 of the cover-tile deposit a coating upon the cooler 13 which greatly reduces its efficiency.

To overcome these disadvantages and still maintain the glass in the closed end of the receptacle 2 at the proper temperature, a cover plate or shield 23 has been positioned closely above this portion of the molten glass. This plate is supported at one end on the end wall 4 of the receptacle and at its other end is carried in a notch or recess in the down-turned end 22 of cover-tile 20. Suitable electric heating coils 24, which may be of any approved form or construction, are carried by the lower surface of plate 23 so that the heat therefrom will be directed downwardly against the surface glass and maintain this glass at the required temperature. Heating gases may or may not be allowed to flow beneath cover-tile 20 and above the plate 23 to increase the heat radiation from these parts. In any case the plate 23 will shield the surface glass in the closed end of the pot from any dirt or soot that might be deposited by these gases, and will also protect the cooler 13 from any such gases as might otherwise escape beneath the down-turned end 22 of the cover-tile.

Furthermore, the evenly radiated heat from the electric heaters will maintain the surface strata of glass at the closed end of the receptacle in a more uniform and homogeneous condition than can be obtained by the direct application of heated gases, as has been the practice in the past. The lower strata of glass, that flow from the melting furnace, beneath the sheet source 12, rise to the surface to replace the upper strata which are being drawn into the sheet 2. Before being drawn into the sheet this glass is exposed to the evenly radiated glow from the electric heating elements 24 thereabove, this heat treatment refining this surface glass and giving it a uniform and homogenous quality comparable to that of the surface glass that flows uninterruptedly through the refining and cooling tanks into the opposite side of the sheet.

Claims:

1. In combination, a receptacle containing molten glass, and a protecting and heating means for the surface glass, comprising a cover plate for the receptacle and exposed electric heating elements mounted on the plate above the molten glass and out of contact therewith.

2. In a sheet glass drawing apparatus, in combination, a receptacle for molten glass, closed at one end and in open communication with a source of molten glass at the other end, means for drawing a sheet of glass from the receptacle, and exposed electric heating elements positioned above the glass in the closed end of the receptacle, out of contact with and adapted for maintaining this surface glass at the required temperature.

3. In a sheet glass drawing apparatus, in combination, a receptacle for molten glass, closed at one end and in open communication with a source of molten glass at the other end, means for drawing a sheet of glass from the receptacle, a shielding plate positioned closely adjacent the molten glass in the closed end of the receptacle, and exposed electric heating elements carried by this plate for maintaining the surface glass at the proper temperature.

4. In a sheet glass drawing apparatus, in combination, a receptacle for molten glass, closed at one end and in open communication with a source of molten glass at the other end, means for drawing a sheet of glass from the receptacle, a heating furnace enclosing the bottom and the closed end of the receptacle, a shielding plate positioned closely adjacent the molten glass in the closed end of the receptacle, and electric heating elements carried by this plate for maintaining the surface glass at the proper temperature.

5. In a sheet glass drawing apparatus, in combination, a receptacle for molten glass, closed at one end and in open communication with a source of molten glass at the other end, means for drawing a sheet of glass from the receptacle, heating means beneath the receptacle, and a combined shield and electric heater positioned above the glass in the closed end of the receptacle for maintaining the surface glass therein at the required temperature the electric heater including a plurality of exposed elements arranged out of contact with the molten glass.

6. In a sheet glass drawing apparatus, in combination, a receptacle for molten glass, closed at one end and in open communication with a source of molten glass at the other end, means for drawing a sheet of glass from the receptacle, cover-tiles enclosing the molten glass in the receptacle at each side of the sheet source, and a combined shield and electric heater positioned beneath the cover-tile and closely adjacent the molten glass in the closed end of the receptacle, for maintaining this surface glass at the proper temperature.

7. In a sheet glass drawing apparatus, in combination, a receptacle for molten glass, closed at one end and in open communication with a source of molten glass at the other end, means for drawing a sheet of glass from the receptacle, a pair of coolers positioned one at either side of the sheet source, cover-tiles enclosing the molten glass in the receptacle at each side of the sheet source and coolers, and a combined shield and electric heater positioned beneath the cover-tile and closely adjacent the molten glass in the closed end of the receptacle, for maintaining this surface glass at the proper temperature.

8. In a sheet glass drawing apparatus, in combination, a tank furnace, a draw-pot in open communication therewith, means for drawing a sheet of glass from a mass of molten glass therein, means for heating the surface of the glass on one side of the sheet from heat currents from the tank furnace, and electric heat-radiating means for heating the surface of the glass on the opposite side of the sheet being drawn.

9. In a sheet glass drawing apparatus, in combination a tank furnace, a draw pot in open communication therewith, means for drawing a sheet from a mass of molten glass therein, a shield arranged above the glass in the closed end of the pot, and electric heating elements carried by the bottom of the shield, said shield and heating elements being out of contact with the molten glass.

Signed at Toledo, in the county of Lucas and State of Ohio, this 18th day of April, 1923.

ARTHUR E. FOWLE.